(12) United States Patent
Seddon et al.

(10) Patent No.: US 7,536,073 B2
(45) Date of Patent: May 19, 2009

(54) FIBER OPTIC CABLE HAVING A DRY INSERT AND OFFSET CAVITY

(75) Inventors: David Alan Seddon, Hickory, NC (US); Kenneth D. Temple, Jr., Newton, NC (US); Bradley J. Blazer, Granite Falls, NC (US); Anne G. Bringuier, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/603,709

(22) Filed: Nov. 22, 2006

(65) Prior Publication Data
US 2008/0118210 A1    May 22, 2008

(51) Int. Cl.
*G02B 6/44* (2006.01)
(52) U.S. Cl. ........................................ 385/114; 385/100
(58) Field of Classification Search .......... 385/100–114
See application file for complete search history.

(56) References Cited

U.S. PATENT DOCUMENTS

| | | | |
|---|---|---|---|
| 4,054,365 A | 10/1977 | Marx et al. | |
| 4,097,119 A * | 6/1978 | Kumamaru et al. | 385/102 |
| 4,422,889 A * | 12/1983 | Trezeguet et al. | 156/70 |
| 5,668,912 A * | 9/1997 | Keller | 385/100 |
| 6,970,629 B2 | 11/2005 | Lail et al. | 385/100 |
| 7,177,507 B2 | 2/2007 | Parsons et al. | 385/100 |
| 7,236,670 B2 | 6/2007 | Lail et al. | 385/100 |
| 7,254,302 B2 | 8/2007 | Parsons et al. | 385/100 |
| 2003/0059181 A1 | 3/2003 | Jackman et al. | |
| 2004/0057681 A1* | 3/2004 | Quinn et al. | 385/110 |
| 2004/0120663 A1* | 6/2004 | Lail et al. | 385/100 |
| 2004/0240806 A1* | 12/2004 | Lail et al. | 385/100 |
| 2005/0013573 A1* | 1/2005 | Lochkovic et al. | 385/128 |
| 2006/0165355 A1 | 7/2006 | Greenwood et al. | 385/100 |
| 2007/0025668 A1* | 2/2007 | Greenwood et al. | 385/103 |
| 2007/0098339 A1 | 5/2007 | Bringuier et al. | 385/106 |

FOREIGN PATENT DOCUMENTS

| | | |
|---|---|---|
| WO | WO01/63332 | 8/2001 |
| WO | WO01/75498 | 10/2001 |
| WO | WO02/095473 | 11/2002 |
| WO | WO2005/119321 | 12/2005 |

* cited by examiner

*Primary Examiner*—Charlie Peng
(74) *Attorney, Agent, or Firm*—C. Keith Montgomery

(57) ABSTRACT

A fiber optic cable includes at least one optical waveguide, at least one dry insert and a cable jacket. The at least one optical waveguide and at least one dry insert are at least partially disposed within an offset cavity of the cable jacket. The at least one dry insert is disposed in the offset cavity with the at least one optical waveguide near the central axis of the fiber optic cable.

17 Claims, 4 Drawing Sheets

FIBER OPTIC CABLE HAVING A DRY INSERT AND OFFSET CAVITY

FIELD OF THE INVENTION

The present invention relates generally to dry packaging of optical waveguides. More specifically, the invention relates to optical assemblies for communication systems that include at least one dry insert for protecting at least one optical waveguide in an offset cavity.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube or cavity, thereby forming an assembly. Generally speaking, the tube or cavity protects the optical waveguide; however, the optical waveguide must be further protected. For instance, the optical waveguide should have some relative movement between the optical waveguide and the tube or cavity to accommodate bending. On the other hand, the optical waveguide should be adequately coupled with the tube or cavity, thereby inhibiting the optical waveguide from being displaced within the tube or cavity when, for example, pulling forces are applied to install the cable. Additionally, the tube assembly or cavity should inhibit the migration of water therein. Moreover, the fiber optic cable should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube or cavity, cushioning, and coupling of the optical waveguide. Additionally, thixotropic materials are effective for blocking the migration of water. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the fiber optic cable at relatively high temperatures and the thixotropic materials may cause optical attenuation at relatively low temperatures.

Cable designs have attempted to eliminate thixotropic materials, but the designs are generally inadequate because they do not meet all of the requirements and/or are expensive to manufacture. One example that eliminates the thixotropic material is U.S. Pat. No. 4,909,592, which discloses a tube having conventional water-swellable tapes and/or yarns disposed therein. For instance, conventional water-swellable tapes are typically formed from two thin non-woven layers that sandwich a water-swellable powder therebetween, thereby forming a relatively thin tape that does not fill the space inside a buffer tube. Consequently, conventional water-swellable tapes do not provide adequate coupling for the optical waveguides because of the unfilled space. Additionally, the space allows water within the tube to migrate along the tube, rather than be contained by the conventional water-swellable tape. Thus, this design requires a large number of water-swellable components within the tube for adequately coupling the optical fibers with the tube. Moreover, the use of large numbers of water-swellable components inside a buffer tube is not economical because it increases the manufacturing complexity along with the cost of the cable.

Another example that eliminates the thixotropic material from a fiber optic cable is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

SUMMARY OF THE INVENTION

To achieve these and other advantages and in accordance with the purpose of the invention as embodied and broadly described herein, the invention is directed in one aspect to a fiber optic cable that includes at least one optical waveguide, a cable jacket having a cavity, and a dry insert. The at least one optical waveguide is at least partially disposed within the cavity along with the dry insert so that the at least one optical waveguide is disposed between the dry insert and the cable jacket for coupling the at least one optical waveguide to the cable jacket. Specifically, the cable jacket has a central longitudinal plane extending therealong and the cavity has a central axis that is parallel to and offset from the central longitudinal plane of the cable jacket so that the dry insert is generally disposed to one side of the central longitudinal plane of the cable jacket.

In another aspect, the invention is directed to a fiber optic cable that includes at least one optical waveguide, a cable jacket having a cavity, and a dry insert. The at least one optical waveguide is at least partially disposed within the cavity along with the dry insert so that the at least one optical waveguide is disposed between the dry insert and the cable jacket. The cable jacket has a first major surface, a second major surface, with the first and second major surfaces of the cable jacket being generally flat. The cavity has a first wall and a second wall that are opposed to one another and the cable jacket has a first thickness between the first major surface and the first wall of the cavity and a second thickness between the second major surface and the second wall of the cavity, wherein the first thickness is greater than the second thickness such that the cavity is disposed closer to the second major surface of the cable jacket so that the cavity is offset within the cable jacket. Additionally, the at least one optical waveguide is disposed about a neutral axis of the fiber optic cable within the offset cavity.

In yet another aspect, the invention is directed to fiber optic cable that includes at least one fiber optic ribbon, a cable jacket, and a dry insert. The cable jacket has two major surfaces that are generally flat and defines a cavity therein having a generally rectangular cross-section, wherein the cavity is disposed closer to one of the two major surfaces than the other so that the cavity is offset within the cable jacket. The at least one optical waveguide being at least partially disposed within the cavity along with the dry insert. Specifically, the dry insert is disposed within the cavity so that the at least one optical waveguide is disposed between the dry insert and the cable jacket for coupling the at least one optical waveguide to the cable jacket for providing a coupling force of at least about 0.1625 Newtons per optical waveguide for a thirty-meter length of fiber optic cable. Additionally, the at least one optical waveguide is disposed about a neutral axis of the fiber optic cable within the offset cavity.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Figure 1:
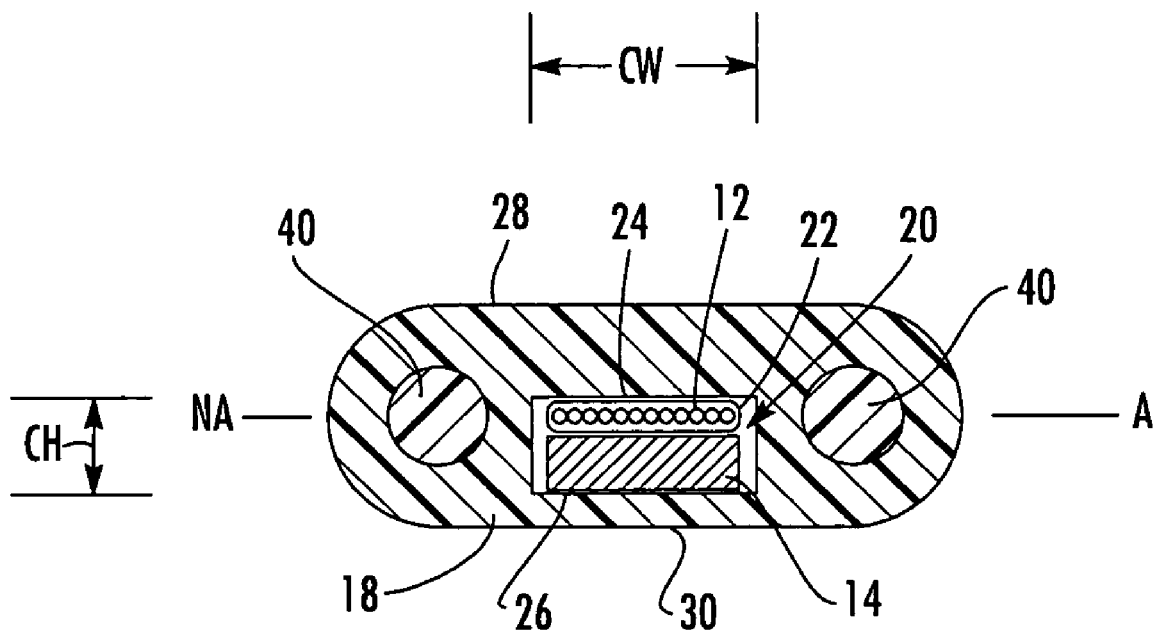
FIG. 1 is a cross-sectional view of a tubeless fiber optic cable according to the present invention.

Reference will now be made in detail to the present preferred embodiments of the invention, examples of which are illustrated in the accompanying drawings. Whenever practical, the same reference numerals will be used throughout the drawings to refer to the same or like parts. Illustrated in FIG. 1 is an exemplary fiber optic cable 10 according to one aspect of the present invention. Fiber optic cable 10 includes at least one optical waveguide 12 such as an optical fiber, a dry insert 14, and a cable jacket 18. The at least one optical waveguide 12 and the dry insert 14 are disposed in a cavity 20 of fiber optic cable 10. In this case, the at least one optical waveguide 12 is a portion of a fiber optic ribbon 22. Fiber optic cable 10 includes one ribbon, but other variations may have a plurality of ribbons. Dry insert 14 is preferably disposed on only one side of the at least one optical waveguide 12. Dry insert 14 performs functions such as cushioning, coupling, inhibiting the migration of water, and accommodates bending of fiber optic cable 10. Dry insert 14 is advantageous because the optical waveguides are easily removed from fiber optic cable 10 without leaving a residue or film that requires cleaning before connectorization. Moreover, unlike conventional thixotropic materials, dry insert 14 does not change viscosity with temperature variations or have a propensity to drip from an end of the fiber optic cable at high temperatures.

Cavity 20 is disposed in fiber optic cable 10 in an offset manner as illustrated in FIG. 1. Cavity 20 preferably has two opposing internal major surfaces 24,26 that correspond to the major surfaces 28,30 of cable jacket 18 and define a cavity width CW. Cavity 20 also preferably has two opposing internal minor surfaces 32,34, that define a cavity height CH. Internal major surface 26 of cavity 20 is closer to its corresponding major surface 30 of cable jacket 18 than the other internal major surface 24 is to its major surface 28 of cable jacket 18, causing cavity 20 to be offset toward major surface 30 and away from the horizontal axis A. Dry insert 20 is disposed against the internal major surface 26, with the optical waveguide 12 disposed between dry insert 14 and internal major surface 24. In this way, the optical waveguide 12 is located about at the horizontal axis A or a neutral axis NA of fiber optic cable 10. In other words, the optical waveguides tend to undulate above and below neutral axis NA due to their excess length, thereby inhibiting bending stresses to the extent possible. As noted below in more detail, dry insert 14 couples the optical waveguide 12 to cable jacket 18.

Fiber optic cable 10 also preferably includes at least one strength member 40 for providing tensile strength and in this embodiment includes two strength members 40 disposed on opposite sides of cavity 20. Strength members 40 may be formed from any suitable materials such as dielectrics, conductors, composites or the like. By way of example, strength members in this embodiment are glass-reinforced plastic (GRPs), thereby forming a dielectric cable. Variations of fiber optic cable 10 may include a heat shield element between fiber optic ribbon 22 and internal major surface 24 for inhibiting sticking of the fiber optic ribbon and/or protecting the same. Heat shield element may be any suitable material such as a paper tape, mylar, or the like and may further include a water-swellable material.

As depicted, optical waveguide 12 of FIG. 1 is an optical fiber that forms a portion of an optical fiber ribbon 22. In this case, the optical waveguides 12 are preferably a plurality of single-mode optical fibers in a ribbon format. Additionally, other types or configurations of optical waveguides can be used. For example, optical waveguide 12 can be multi-mode, pure-mode, erbium doped, polarization-maintaining fiber, bend-resistant optical fibers, other suitable types of optical waveguides, and/or combinations thereof. Moreover, optical waveguide 12 can be loose or in bundles. Each optical waveguide 12 may include a silica-based core that is operative to transmit optical signals and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003. Optical waveguide 12 can also include an identifying means such as ink or other suitable indicia for identification. Of course, optical waveguide 12 can also include a tight buffer layer. Suitable optical fibers are commercially available from Corning Incorporated of Corning, N.Y.

Figure 2:
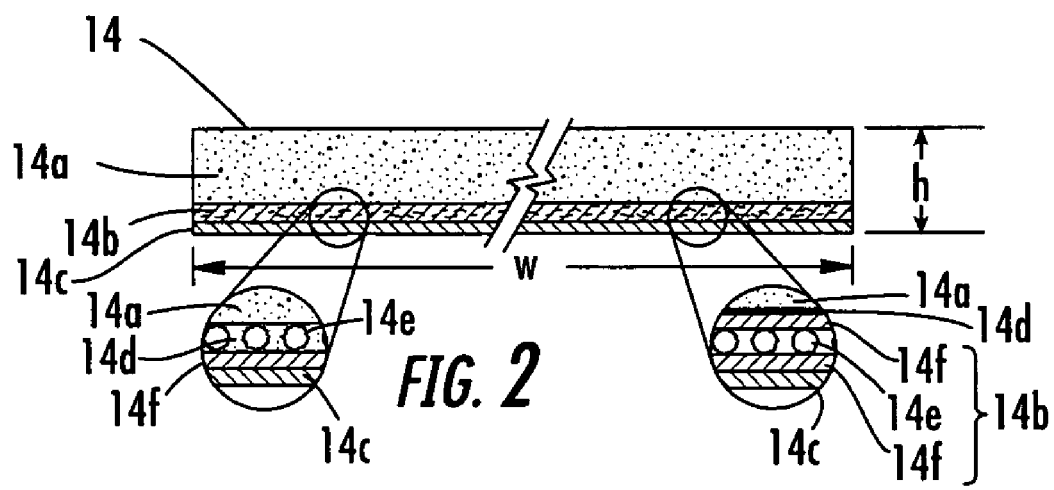
FIG. 2 is a cross-sectional view of the dry insert of the fiber optic cable of FIG. 1.

FIG. 2 illustrates a cross-sectional view of an explanatory dry insert 14. Dry insert 14 is formed from an elongate material or materials (i.e., an elongate tape) that are capable of being paid off from a reel for a continuous application during manufacture. Dry insert 14 can be formed from a plurality of layers that can perform different functions; however, the dry insert can be a single layer such as a felt material that is compressible and may optionally include a water-blocking/water-swellable feature. Dry insert 14 cushions optical waveguide 12 from cable jacket 18, thereby maintaining optical attenuation of optical waveguide 12 below about 0.4 dB/km at a reference wavelength of 1310 nm and 0.3 dB/km at a reference wavelengths of 1550 nm and 1625 nm. But other suitable optical attenuation values are possible such as 0.35/0.25 for the respective 1310 and 1550 reference wavelengths. In one embodiment, dry insert 14 is formed from two distinct layers. For instance, FIG. 2 depicts a first layer 14a of dry insert 14 that is a compressible layer and second layer 14b that is a water-swellable layer. In this case, first layer 14a is formed from a compressible material having a predetermined spring constant for providing adequate coupling characteristics. By way of example, the first layer is a foam tape such as an open cell foam tape; however, any suitable compressible material can be used such as a closed cell foam tape. As shown in FIG. 2, second layer 14b can have any suitable construction and in preferred embodiments is a suitable water-swellable tape having one or more components. For instance, water-swellable tapes can have different constructions as shown by the two different detail bubbles of FIG. 2, but generally include at least one tape such as a non-woven tape 14f having a plurality of water-swellable particles 14e. However, dry insert 14 can include other types of particles and/or compositions formed from one or more materials.

First layer 14a and second layer 14b are preferably attached together with an adhesive 14d so that a suitable force is required to separate the layers. For instance, adhesive 14d can be sprayed onto one or both of the layers during manufacture, thereby creating a fine mist that inhibits clusters of adhesive from forming; however, other suitable application methods are also possible. But, the adhesive may have other forms such as a powder that is applied to one or more layers. Whatever the form of adhesive used, it should not cause elevated levels of attenuation when the dry insert is placed about the optical waveguide. Likewise, water-swellable particles or conglomerate particles such as adhesive and/or water-swellable particles should not cause microbending. In other words, the average particle size of adhesive 14d, or other conglomerate materials such as adhesive and water-swellable powder, should be relatively small such as 600 microns or less, preferably about 450 microns or less, and most preferably about 300 microns or less so that if the particles press against the optical waveguide through a portion of dry insert 14 they will not cause elevated levels of microbending. As used herein, average particle size refers to particles of one or more materials used in dry insert 14.

As shown in the right detail bubble of FIG. 2, second layer 14b is a water-swellable tape having water-swellable particles 14e disposed between two non-woven tape-like materials 14f that is attached by adhesive 14d to first layer 14a. This construction inhibits particles from causing microbending since there is a non-woven tape that acts as a buffer between first layer 14a and water-swellable particles 14e. The average particle size of the water-swellable powder should be relatively small such as 600 microns or less, preferably about 450 microns or less, and most preferably about 300 microns or less so that if the water-swellable particles press against the optical waveguide through a portion of dry insert 14 they will not cause elevated levels of microbending. Second layer 14b can also have other constructions such as shown in the left detail bubble of FIG. 2. Specifically, this detail bubble shows water-swellable particles 14e attached to one side of a single non-woven tape 14f, which is then attached to compressible first layer 14a so that water-swellable particles 14e are disposed therebetween without a non-woven tape buffer layer. In this construction adhesive 14f functions to attach water-swellable particles 14e and to attach the first and second layers 14a,14b of dry insert 14 together. However, this construction of dry insert 14 generally leads to a larger average particle size of a conglomerate material formed of adhesive and water-swellable particles. In other words, all things being equal the average particle size in this dry insert construction is generally larger because it creates a conglomerate particle compared with the water-swellable particle alone. Consequently, this may cause elevated microbending if the average particle size becomes too large. So in this construction the average particle size of the conglomerate or composite particle should be in the same range as stated above for inhibiting microbending.

Likewise, the inner surface of dry insert 14 should not cause elevated levels of microbending. Thus, in preferred embodiments, a surface of the layer that can contact the optical waveguides should have a relatively smooth surface. For instance, if foam is used as first layer 14a of dry insert 14 an average cell size of the foam is about 1000 microns or less, and can be about 700 microns or less, thereby creating a relatively smooth surface. Additionally, the foam may have layers with different size cells such as larger cells away from the optical waveguides and smaller cells near the surface of the foam that can contact the optical waveguides. Other variations include a surface treatment for smoothing the surface of the foam layer. Surface treatments include heating to smooth out the surface or filling the cells with a suitable material. Additionally, first layer 14a such as foam cushions the water-swellable particles and/or adhesive of dry insert 14 from causing microbending.

In one embodiment, the first layer of dry insert 14 is an open cell polyurethane (PU) foam tape. The PU foam tape may either be an ether-based PU or an ester-based PU, but other suitable foam tape compressible layers can be used such as a polyethylene foam, a polypropylene foam, or EVA foam. However, preferred embodiments use an ether-based foam tape since it performs better than an ester-based PU foam when subject to moisture. In other words, the ester-based PU foam can break down with moisture, whereas the ether-based PU foam is generally more robust with respect to moisture. Additionally, the foam layer has a predetermined density generally in the range of about 1 lb/ft$^3$ to about 3 lb/ft$^3$. Dry insert 14 also has a predetermined ultimate tensile strength to inhibit breakage during manufacture. Generally speaking, with dry inserts having both a compressible layer and a water-swellable layer the majority of the tensile strength is provided by the water-swellable layer(s). The ultimate tensile strength of the dry insert is preferably about 5 Newtons per centimeter width W of dry insert 14 or greater.

Dry insert 14 may have a water-swell speed so that the majority of swell height of the water-swellable substance occurs within about 120 seconds or less of being exposed to water, more preferably about 90 seconds or less. By way of example, dry insert 14 may have a maximum swell height of about 18 mm for distilled water and about 8 mm for a 5% ionic water solution i.e., salt water in an unrestricted swell state; however, dry inserts with other suitable maximum swell heights may be used. Tube assemblies may be constructed with a water-swell ratio of about 3 or more, about 5 or more, and up to about 7 or more. Water-swell ratio is defined as the unrestricted cross-sectional swell state area of the dry insert divided by the free space in the tube assembly. For round cables, the free space of the tube assembly is defined as an area of an inner diameter of the tube minus the area that the optical waveguides occupy. For instance, if the dry insert has an unrestricted cross-sectional swell state area of 50 mm$^2$ and the tube has a free space of 10 mm$^2$ the water-swell ratio is five. Dry insert 14 preferably has an uncompressed height h of about 5 mm or less for minimizing cable size such as the tube diameter, cable diameter, and/or cable height; however, any suitable height h can be used for dry insert 14. Additionally, height h of dry insert 14 need not be constant across the width, but can vary, thereby conforming to the cross-sectional shape of the optical waveguides and providing improved cushioning to improve optical performance. Second layer 14b is a water-swellable layer such as a tape that inhibits the migration of water within cable jacket 18.

Dry insert 14 may be compressed during assembly so that it provides a predetermined normal force that inhibits optical waveguide 12 from being easily displaced longitudinally along cable jacket 18. In other embodiments, first layer 14a of dry insert 14 is uncompressed in fiber optic cable 10, but begins to compress if optical waveguide movement is initiated. In further embodiments, the excess fiber length can aid in providing coupling since it causes undulations in the optical waveguides that create a local compression of dry insert 14. Other variations include attaching or bonding a portion of dry insert 14 to cable jacket 18. For example, adhesives, glues, elastomers, and/or polymers 14c are disposed on a portion of the surface of dry insert 14 that contacts cable jacket 18 for attaching dry insert 14 to cable jacket 18. For instance, layer 14c is a polymer layer that at least partially melts during the extrusion of cable jacket 18, thereby creating a bond therebetween and increasing the force needed to pull out the optical fibers.

No matter the construction and/or materials of the dry insert it should provide a suitable level of coupling of the optical waveguides to the cable jacket. Additionally, in order to quantify the amount of coupling for the optical waveguides a relatively long length of fiber optic cable is required. By way of example, optical fibers of cables according to the present invention have a coupling force of at least about 0.1625 Newtons per optical fiber for a thirty-meter length of fiber optic cable. Illustratively, a fiber optic cable having a single ribbon with ten optical fibers in the ribbon should have a coupling force of about 1.95 Newtons or greater for a thirty-meter length of fiber optic cable. Likewise, a similar fiber optical cable having a single optical fiber ribbon with six optical fibers should have a coupling force of about 0.975 Newtons or greater for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the EFL (or ERL) must be straightened so that the coupling force is the amount of force required to move the entire length of optical fibers within the thirty-meter fiber optic cable sample.

Figure 3:
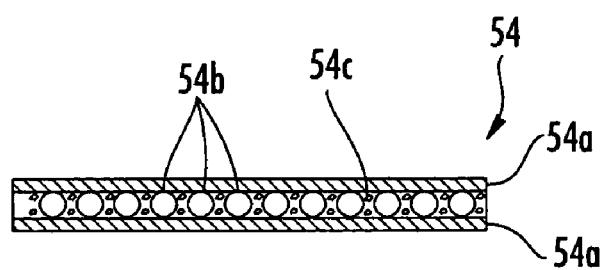
FIGS. 3-6 are cross-sectional views of alternative dry inserts according to the present invention.

Dry inserts of the present invention can use other suitable materials and/or constructions while still providing cushioning, coupling, and/or allowing movement of the optical fibers. Moreover, like the other dry inserts the water-swellable layer is optional and can use any suitable material(s)/construction(s). FIG. 3 depicts one example of another dry insert 54. Dry insert 54 includes a compressible layer formed from a plurality of microspheres 54b disposed between a top tape 54a and bottom tape 54a. As with other tapes, tapes 54a can be formed from any suitable material such as a non-woven material, Mylar, or other like materials. More specifically, microspheres 54b are generally disposed between tapes 54a and are attached using a suitable method such as an adhesive, bonding agent, application of heat and/or pressure, or the like. Additionally, an optional water-swellable substance such as a plurality of water-swellable particles or water-swellable coating 54c may also be disposed between tapes 54a with microspheres 54b or on a portion one or more tapes 54a. Suitable materials for microspheres 54b are relatively soft so they are compressible and sized so that they will not cause undue levels of optical attenuation if they press against the optical waveguide or optical fiber ribbon. By way of example, suitable hollow microspheres are available from Akzo Nobel of the Netherlands under the trade name EXPANCEL® and includes copolymers of monomers vinylidine chloride, acrylonitrile, and methylmethacrylate. Other plastic hollow microspheres are available from Asia Pacific Microspheres of Malaysia under the tradename of PHENOSET®, which are phenolic and amino-based microspheres.

The compressible nature of hollow polymeric microspheres is suited for providing adequate coupling of the optical fibers to the cable jacket or tube. Additionally, the smooth round surface of these microspheres permits pressing against the optical fibers without inducing elevated levels of optical attenuation such as during bending, twisting, or crushing of the optical fiber cable. Additionally, the size of the hollow microspheres can vary from about 1 micron to about 300 microns, likewise, a wall thickness of the microspheres can also vary from about 0.1 micron up to several microns, but other suitable dimensions are possible as long as a suitable level of optical performance is maintained.

Figure 4:
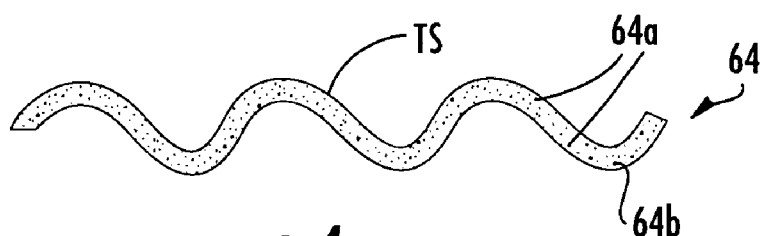

FIG. 4 depicts another example of a dry insert 64 that provides a compressible layer 64b using the geometry of its shape. More specifically, compressible layer 64b is provided by using a dimensional fabric 64a that has a generally textured shape in one or more directions for providing the compressible layer. As shown, dry insert 64 includes a generally textured shape TS and is formed from a suitably soft and flexible material so that it can deform for providing an adequate level of coupling for the optical fibers or ribbons without causing undue levels of optical attenuation. By way of example, suitable fabrics are available from Freudenberg of Durham, N.C. under the name of Novolon. The dimensional fabrics may be formed from a variety of materials such as polyester, polypropylene, nylon, or other suitable materials. Generally speaking, dimensional fabrics are formed using a molding process for transforming a two-dimensional (i.e., flat) fabric or substrate into a three-dimensional (i.e., textured shape) fabric or substrate with the desired textured shape TS. The coupling and/or compressibility of dry insert 64 can be tailored by changing parameters such as the number of contact points per surface area (i.e., changing the density of high and low contact points), the height from a high point to a low point, the dimension fabric profile, and/or flexibility of the dimensional fabric. Again, dry insert 64 can include an optional water-swellable layer for blocking the migration of water along the cable or tube assembly. For instance, the water-swellable layer may be a coating applied to one or more surfaces or applied to the fibers of the dimensional fabric, include water-swellable particles disposed in or on the dry insert, and/or may include superabsorbent fibers. Suitable water-swellable filaments are, for example, LANSEAL® materials available from Toyobo of Osaka, Japan or OASIS® materials available from Technical Absorbents Ltd. of South Humberside, United Kingdom.

Figure 5:
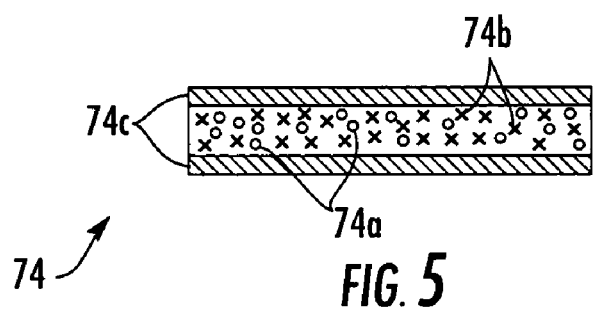

FIG. 5 depicts a further embodiment of a dry insert 74 having a compressible layer 74b having a non-woven layer of felt substance made of one or more materials formed from non-continuous and/or continuous filaments. Dry insert 74 may optionally include a water-swellable layer and/or one or more tapes for attaching the felt substance thereto. For instance, dry insert 74 includes a plurality of water-swellable filaments 74a along with other filaments 74b that are non-swellable disposed between a plurality of optional tapes 74c, thereby forming dry insert 74, As used herein, felt substance means a material comprising one or more types of non-continuous or continuous filaments and/or fibers which have been caused to adhere and/or mat together through the action of heat, moisture, chemicals, pressure, or mechanical action such as needle-punching or spun-lacing, or a combination of the foregoing actions, thereby forming a relatively thick and compressible layer. Water-swellable filaments 74a may comprise any suitable water-swellable material. By way of example, dry insert 74 of FIG. 5 may include about 25% or less by weight of water-swellable filaments 74a and about 75% or more by weight of other filaments 74b; however, other suitable ratios are possible. Other filaments 74b may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 74b and may be tailored for providing specific characteristics.

Figure 6:
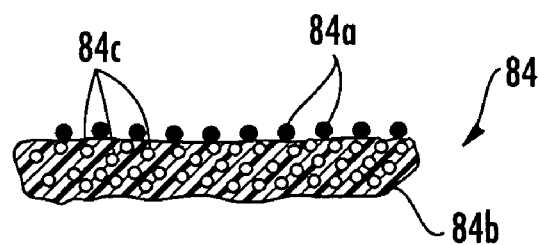

FIG. 6 depicts yet another dry insert 84 shaped as a generally flat tape having a compressible layer with a suitable width. By way of example, dry insert 84 is made of a plurality of filaments 84c such as a plurality of generally continuous polyester filaments grouped together by a compressible layer 84b that acts as a matrix material, but the use of other filament materials is possible. Compressible layer 84b is formed by, for instance, foaming the matrix material. Additionally the matrix material is used for attaching a plurality of water-swellable particles to dry insert 84 for forming a water-swellable layer 84a. Suitable foamed matrix materials include vinyls, polyurethanes, polypropylenes, EVAs, or polyethylene blends. The plurality of filaments and the matrix material are run through a die that forms dry insert 84 into its desired shape such as a generally flat ribbon-like profile. Dry inserts 84 may be run parallel to the fiber ribbons in a single layer or sandwich configuration or have other configurations such as helically wrapped about the optical fibers or ribbon stack. Other similar constructions are possible using any suitable materials for providing the compressible layer 84b and the water-swellable layer 84a. Dry insert can include still other constructions and/or materials such as sponge-like materials for a compressible layer such as polyvinylalcohol (PVA). Further, dry inserts can include other suitable materials and/or layers for other purposes such as a flame-retardant material and/or layer.

Additionally, ribbon embodiments of the present invention may have a positive excess ribbon length (ERL), although a negative ERL may be possible with some cable designs, but generally speaking performance may be affected. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, fiber optic cables generally have a positive ERL, such as a positive ERL in the range of about 0.0% to about 0.8% or greater, but other suitable values may be possible. Likewise, embodiments having loose or bundled optical fibers may include a positive excess fiber length (EFL) within a suitable range for the cable configuration.

Figure 7:
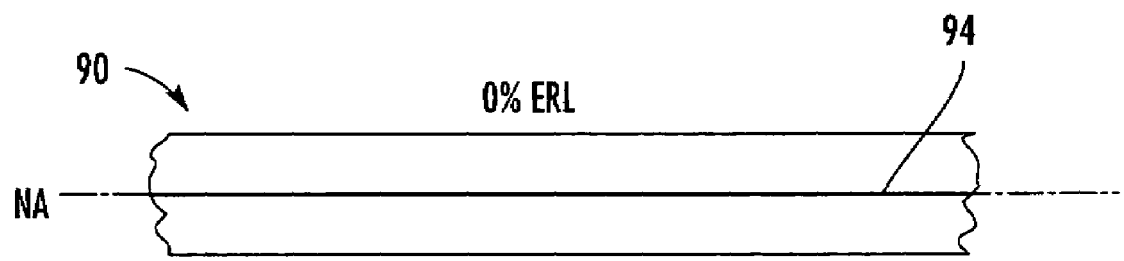
FIGS. 7 and 8 are schematic representations respectively depicting cable with zero excess ribbon length (ERL) and positive ERL.
Figure 8:
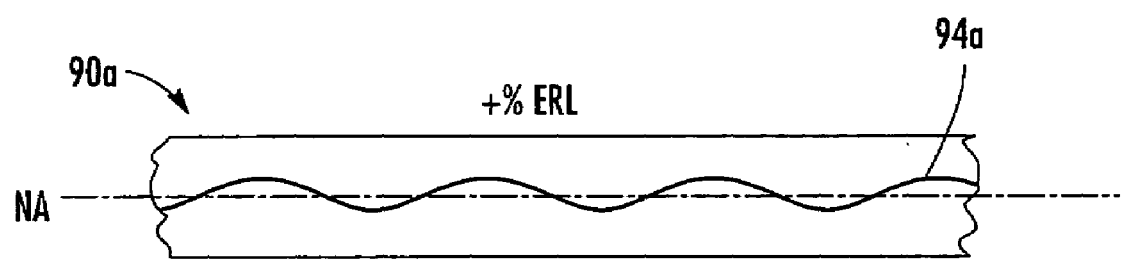

FIGS. 7 and 8 are schematic representations respectively showing the ribbon stacks of two different cables 90,90a laid out in a straight configuration and which generally represent the arrangement of a fiber optic ribbon in a cable according to the present invention. A neutral axis NA of cables 90,90a is represented by the line NA. More specifically, FIG. 7 represents cable 90 with a fiber optic ribbon 94 having zero ERL and FIG. 8 represents cable 90a with a fiber optic ribbon 94a having a positive ERL. As shown, fiber optic ribbon 94 (no ERL) is generally straight within cable 90 along the neutral axis NA and fiber optic ribbon 94a (positive ERL) has a generally undulating profile about the neutral axis NA to accommodate the ERL. When cables 90,90a are bent the ribbons reposition within the cable to accommodate length changes in the cavity due to bending (i.e. the upper surface of the cavity lengthens and the bottom surface of the cavity is shorter).

Figure 9:
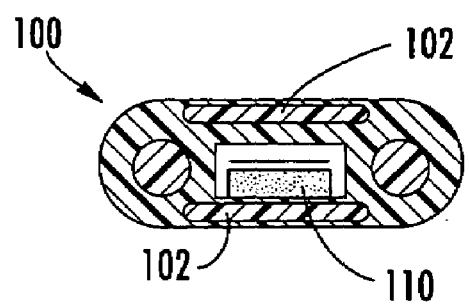
FIGS. 9-14 are cross-sectional views of other fiber optic cables according to the present invention.
Figure 10:
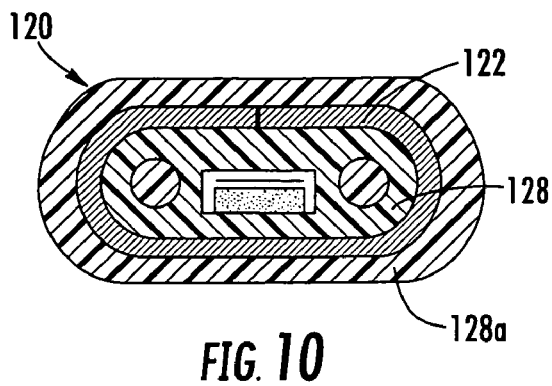

FIG. 9 depicts fiber cable 100 that is similar to fiber optic cable 10, but it further includes at least one armor layer 102 and in this embodiment two armor layers 102. Armor layers 102 are respectively positioned above and below the cavity 110 for inhibiting unintended breaches such as from rodents or point crushing contacts. Armor layer 102 can be formed from any suitable material such as a conductive material such as steel or a dielectric such as polyamide, polycarbonate, or a braided fabric formed from fiberglass, aramid or the like. FIG. 10 depicts another cable 120 that includes at least one armor layer 122. Fiber optic cable 120 is also similar to fiber optic cable 10, but has armor layer 122 wrapped about a cable jacket 128 and is further upjacketed with a second jacket 128a, thereby covering armor layer 122.

Figure 11:
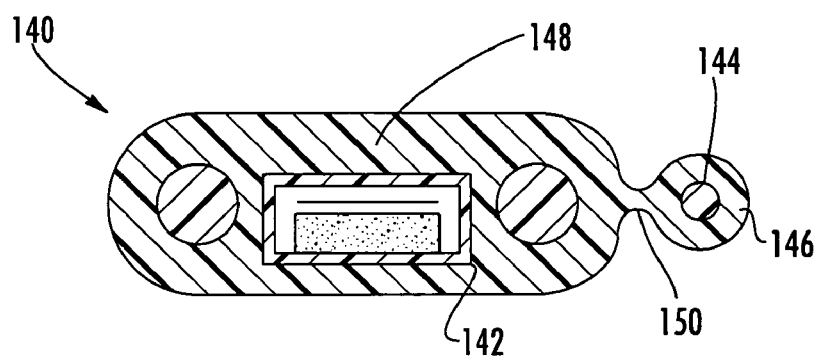

FIG. 11 depicts fiber optic cable 140 that is similar to fiber optic cable 10, but it further includes a tube 142 for protecting the optical fibers. Tube 142 can be formed from any suitable material and further protects the optical fibers of the fiber optic cable. Tube 142 may be formed in a separate extrusion process or as a co-extrusion with a cable jacket 148. Tube 142, along with cable jackets, may be formed from any suitable material such as a polymer. By way of example, one embodiment has a tube formed of HDPE and cable jacket is formed from a MDPE, but any suitable combination of materials may be used. Likewise, flame retardant materials may be used, thereby making the cables suitable for indoor applications. Additionally, fiber optic cable 140 further includes a toning lobe 146 having a toning wire 144 useful for locating the cable in buried applications. Toning lobe 146 is connected to cable jacket 148 by a web 150, thereby allowing toning lobe 146 to be separated from the main fiber optic cable body. Additionally, fiber optic cables without a toning lobe may have the capability of being tonable by using one or more cable components that are conductive. Furthermore, fiber optic cables can conduct electrical power if one or more of the fiber optic cable components are conductive such as including a twisted pair of copper wires or using conductive strength members.

Figure 12:
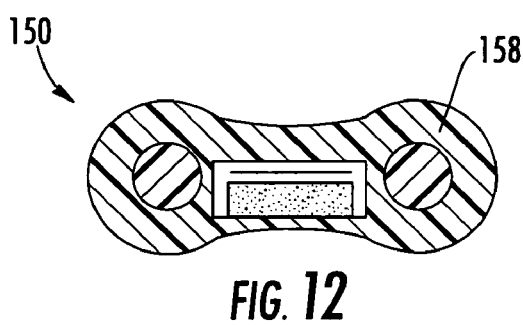
Figure 13:
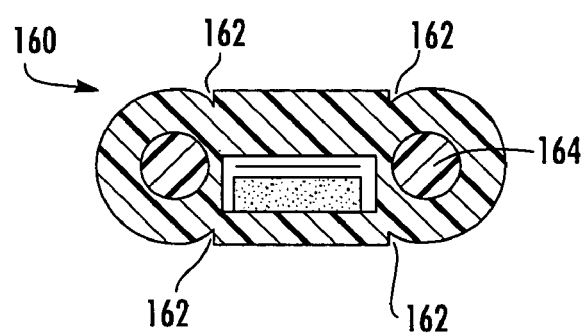
Figure 14:
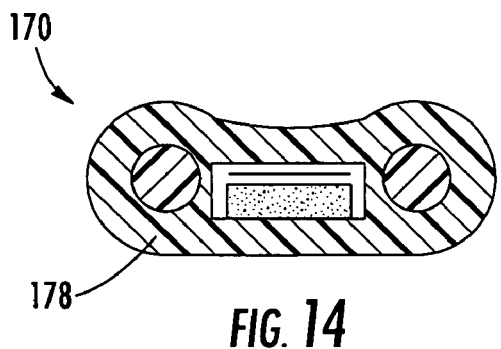

FIGS. 12 and 13 respectively depict cables 150 and 160 that are similar to cable 10, but have different cross-sectional cable shapes. Fiber optic cable 150 depicts a generally dog-bone cable cross-section for cable jacket 158 and fiber optic cable 160 illustrates another variation on the cable cross-section. Fiber optic cable 160 has recessed portions 162 so that the craft can separate one or more of strength members 164 along a portion of the cable. Of course, other cross-sectional shapes and/or variations are possible with the concepts of the invention. By way of example, FIG. 14 depicts a fiber optic cable 170 that has an asymmetrical cable cross-section. More specifically, a cable jacket 178 is generally flat on one-side and has a generally dogbone shape on the other side of the cable jacket. Likewise, other cable cross-sections are possible.

Many modifications and other embodiments of the present invention, within the scope of the appended claims, will become apparent to a skilled artisan. For example, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

What is claimed is:

1. A fiber optic cable comprising:
   at least one optical waveguide;

a cable jacket having a first major surface, a second major surface, and a cavity, the first and second major surfaces of the cable jacket being generally flat and the cavity having a first wall and a second wall, the first and second wall being opposed to one another, the cable jacket having a first thickness between the first major surface and the first wall of the cavity and a second thickness between the second major surface and the second wall of the cavity, the first thickness being greater than the second thickness such that the cavity is disposed closer to the second major surface so that the cavity is offset within the cable jacket, the at least one optical waveguide being at least partially disposed within the cavity; and a dry insert, the dry insert being disposed within the cavity so that the at least one optical waveguide is disposed between the dry insert and the cable jacket so that the optical waveguide contacts a portion of the first wall of the cavity formed by the cable jacket, and the at least one optical waveguide being disposed about a neutral axis of the fiber optic cable.

2. The fiber optic cable of claim 1, the at least one optical waveguide being a portion of a fiber optic ribbon and the fiber optic ribbon contacts a portion of the cable jacket.

3. The fiber optic cable of claim 2, the at least one optical waveguide having an excess ribbon length that is about 0.2% or greater.

4. The fiber optic cable of claim 1, wherein the at least one optical waveguide has a coupling force of at least about 0.1625 Newtons per optical waveguide for a thirty-meter length of fiber optic cable.

5. The fiber optic cable of claim 1, the dry insert includes a foam tape.

6. The fiber optic cable of claim 1, wherein the dry insert includes a compressible layer and a water-swellable layer.

7. The fiber optic cable of claim 1, further comprising at least two strength members that are disposed on opposite sides of the cavity.

8. The fiber optic cable of claim 1, wherein the cavity has a generally rectangular cross-section.

9. The fiber optic cable of claim 1, the fiber optic cable includes a component having a water-swellable characteristic or a water-blocking characteristic.

10. The fiber optic cable of claim 1, the dry insert including a plurality of microspheres.

11. The fiber optic cable of claim 1, the dry insert including a dimensional fabric.

12. The fiber optic cable of claim 1, the dry insert including a felt substance.

13. The fiber optic cable of claim 1, the dry insert including a matrix material and a plurality of filaments.

14. The fiber optic cable of claim 7, wherein the at least one optical waveguide is disposed between the strength members.

15. A fiber optic cable comprising:

at least one optical waveguide;

a cable jacket, the cable jacket having a first major exterior surface, a second major exterior surface, and a central longitudinal plane extending between the first and second major exterior surfaces and along a length of the cable jacket;

a cavity disposed in the cable jacket, the cavity having a central axis that is parallel to and offset from the central longitudinal plane of the cable jacket, wherein the at least one optical waveguide is at least partially disposed within the cavity; and a dry insert, the dry insert being disposed within the cavity so that the at least one optical waveguide is disposed between the dry insert and the cable jacket for coupling the at least one optical waveguide to the cable jacket, wherein the dry insert is generally disposed to one side of the central longitudinal plane of the cable jacket, wherein the first and second major surfaces are generally flat, and the cavity has a first wall and a second wall, the first and second wall being opposed to one another, the cable jacket having a first thickness between the first major surface and the first wall of the cavity and a second thickness between the second major surface and the second wall of the cavity, the first thickness being greater than the second thickness.

16. The fiber optic cable of claim 15, further comprising at least two strength members that are disposed on opposite sides of the cavity and lie in the central longitudinal plane.

17. The fiber optic cable of claim 15, the at least one optical waveguide being a portion of a fiber optic ribbon and the fiber optic ribbon contacts a portion of the cable jacket.

\* \* \* \* \*